United States Patent [19]
Robinson et al.

[11] Patent Number: 6,105,878
[45] Date of Patent: Aug. 22, 2000

[54] CONTROLLED DROPLET SIZE IN ULTRA LOW VOLUME GROUND BORNE SPRAY APPLICATION OF INSECTICIDE

[76] Inventors: Richard David Robinson, P.O. Box 12837, Ft. Pierce, Fla. 34979; Jack H. Dyer, 928 630 West, Frostproof, Fla. 33843

[21] Appl. No.: 09/158,392

[22] Filed: Sep. 22, 1998

[51] Int. Cl.$^7$ ............................. A62C 5/02; B05B 1/24
[52] U.S. Cl. .......................... 239/8; 239/13; 239/77; 239/166; 415/53.1
[58] Field of Search ........................... 239/77, 78, 166, 239/167, 168, 128, 129, 130, 135, 139, 8, 11, 13; 415/53.1

[56] References Cited

U.S. PATENT DOCUMENTS

| | | | |
|---|---|---|---|
| 3,358,809 | 12/1967 | Sukurs et al. | 198/506 |
| 3,504,854 | 4/1970 | Kinkelder | 239/78 |
| 3,917,168 | 11/1975 | Tenney | 239/13 |
| 4,225,084 | 9/1980 | Bals | 239/223 |
| 4,347,978 | 9/1982 | Lenhardt | 239/78 |
| 4,569,480 | 2/1986 | Levey | 239/129 X |
| 4,659,013 | 4/1987 | Ledebuhr et al. | 239/8 |
| 4,886,208 | 12/1989 | Strand | 239/77 |

*Primary Examiner*—Andres Kashnikow
*Assistant Examiner*—Sean P. O'Hanlon
*Attorney, Agent, or Firm*—Norman Friedland; Marvin Aronoff

[57] ABSTRACT

Apparatus and method is provided for applying agriculturally active substances in a controlled manner from the ground in the most effective droplet size range and at ultra low volumes so that efficiency is optimized while contamination of areas adjacent to the targeted area is greatly reduced. The method and apparatus comprise modification of spray units for controlled droplet atomizers comprising at least one tangential vortex crossflow fan having one or more controlled droplet atomizers in the throat of the fan and upstream of the mouth or wide emission opening of the fan, by positioning a wind deflector in the immediate vicinity behind the atomizer so that the atomizer is shielded from direct impingement of the wind generated by the fan and maintaining the liquid active agricultural substance at a temperature at which the liquid has an appropriate fluidity for the desired droplet size and operation of the modified spray unit within fixed parameters of pump speed, fan speed, atomizer turns and tractor velocity to achieve a narrow distribution of droplet sizes within the desired range while emitting relatively low volumes of the active substance in a specific area.

12 Claims, 3 Drawing Sheets

CONTROLLED DROPLET SIZE IN ULTRA LOW VOLUME GROUND BORNE SPRAY APPLICATION OF INSECTICIDE

TECHNICAL FIELD

This invention deals with improvements in the application of protective sprays to crops and particularly to the control of droplet size and output to achieve maximum efficiency in protecting crops while minimizing the exposure of adjacent areas to insecticide.

BACKGROUND OF THE INVENTION

As one skilled in this art will appreciate, depending on the type of application insecticide, herbicide, bacteriostat, fungicide, pesticide, plant nutrient or other active agent applied to crops and their surrounding environment, a preferred droplet size range and spray output is generally required to maximize the effectiveness of the agent and reduce contamination of surrounding areas.

The Caribbean and the Mediterranean fruit flies are exemplary of the type of pest that can cause major damage to crops, particularly citrus crops, but can be effectively controlled by the timely application of appropriate insecticides compounded with attractant baits. It has been established that insecticides such as malathion when combined in the appropriate ratio with a suitable bait and applied in droplets having a diameter of about 600 microns to about 800 microns are most effective in controlling these pests in citrus orchards. Although such droplet sizes are attainable via aerial application this method is necessarily limited to larger orchards where it may be used most efficiently. Even then, areas adjacent to the spray zone may often be contaminated with pesticide, due to ambient weather conditions and drift of the droplet cloud delivered from the air. In addition, in the case of citrus orchards, it is the tops of the trees that will receive the greatest amount of treatment while the core may receive much less of the aerially delivered spray.

While application of such insecticide bait formulations from tractor driven spray units may provide somewhat more specificity, relative to aerial application, in projecting the spray into citrus orchards, high volume fan driven, lamellar flow, droplet atomization spray units as described in U.S. Pat. No. 4,659,013 produce droplets having an average diameter of about 125 microns while at the same time projecting relatively large volumes of insecticide bait formulation. Thus, this approach lacks efficiency because it does not deliver the optimum droplet size range, while still posing a contamination hazard to adjacent areas.

There is a need for a method and means to more closely control the droplet size and output of sprays delivered ground borne in order to obtain the optimum droplet size range for any agricultural formulation that is delivered. There is a further need to at the same time deliver the spray ground borne in a manner that keeps the output volume of the spray low and comparable to the low volumes known in the art to be delivered aerially, so that the minimum effective volume is projected into the agricultural area requiring treatment without causing undue contamination to adjacent areas. In the particular case of pests, such as the Caribbean and the Mediterranean fruit flies, whose propagation can cause widespread damage to citrus crops, a means and method is needed to deliver baited insecticidal formulations in the droplet size known in the art to be most effective in their eradication while at the same time keeping contamination of adjacent non-targeted areas to a minimum. There is a still further need to deliver ground borne the droplet size and volume per acre, of baited insecticide formulations and other agriculturally active substances, currently achieved by aerial delivery so that crops can be treated without the restrictions of weather, daytime application imposed by aerial delivery.

BRIEF DESCRIPTION OF THE INVENTION

The present invention is directed to meeting the foregoing needs by providing a means and method of applying low volumes of agriculturally active substances ground borne in a controlled manner so that contamination with the active substance of areas adjacent to the targeted area is greatly reduced. The method and means comprise modification of spray units for controlled droplet atomizers comprising at least one tangential vortex crossflow fan having one or more controlled droplet atomizers in the throat of the fan, with the atomizers located in spaced-apart relation from each other and upstream of the mouth or wide emission opening of the fan as disclosed in U.S. Pat. No. 4,659,013 which is herein incorporated by reference in its entirety, and operation of the modified spray unit within fixed parameters to achieve a narrow distribution of droplet sizes within the desired range for an active agricultural substance while emitting relatively low volumes of the active substance.

The spray unit for controlled droplet atomizers as exemplified by the unit disclosed in U.S. Pat. No. 4,659,013 is modified as follows: the controlled droplet atomizer spray head, supplied with units produced, for example, by Curtec Sprayers, Inc., of South Haven, Mich. is modified by removing the outer screen from the atomizer spray head and mounting a wind deflector behind the atomizer to prevent wind generated by the tangential vortex crossflow fan from blowing droplets behind the atomizer. The spray unit for controlled droplet atomizers is further modified by providing means to maintain a liquid active agricultural substance at a temperature at which the liquid has an appropriate fluidity for the desired droplet size. The active agricultural substance of appropriate fluidity is delivered to the spray head by means of a peristaltic pump whose drive speed in rpm is maintained in fixed ratio to the linear velocity in miles per hour of the spray unit as it travels over the ground and with the vortex fan of the spray unit maintained at a constant speed and the droplet atomizer rotating at constant rpm.

DESCRIPTION OF THE PREFERRED EMBODIMENTS

Figure 1:
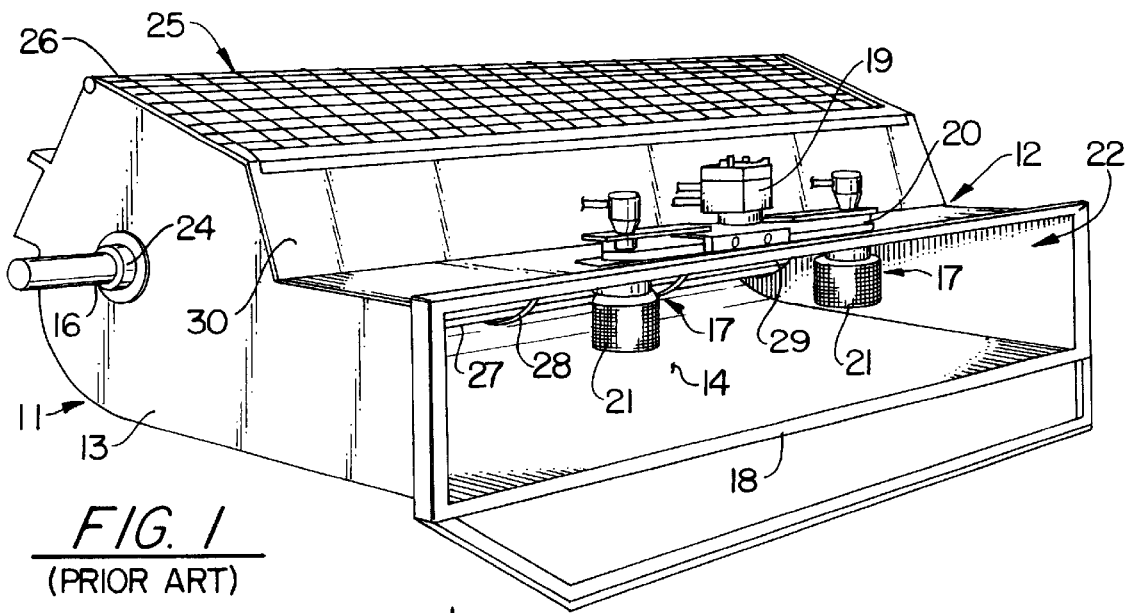
FIG. 1 is a sketch depicting a spray unit for controlled droplet atomizers corresponding to FIG. 1 of U.S. Pat. No. 4,659,013.
Figure 2:
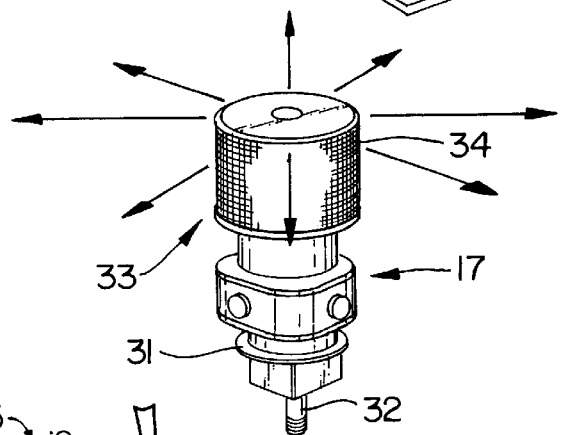
FIG. 2 is a sketch depicting a controlled droplet atomizer corresponding to FIG. 2 of U.S. Pat. No. 4,659,013.
Figure 3:
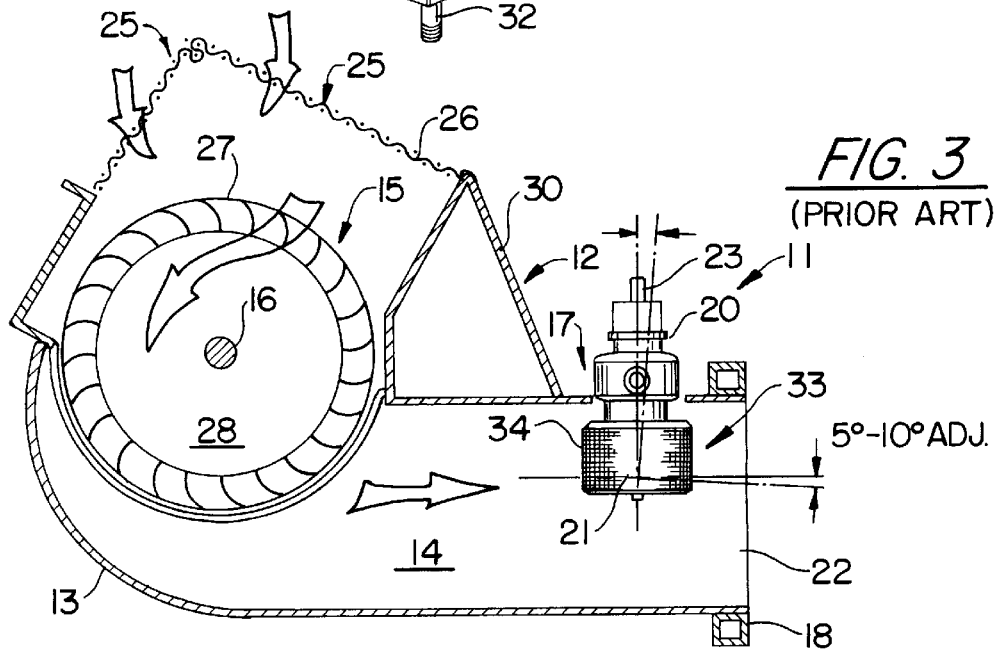
FIG. 3 is a full cross section elevation view taken through the fan and spray unit of FIG. 1 intermediate the controlled droplet atomizers corresponding to FIG. 3 of U.S. Pat. No. 4,659,013.

FIG. 1, FIG. 2 and FIG. 3 are described in detail in the incorporated U.S. Pat. No. 4,659,013. The numeric definitions given in U.S. Pat. No. 4,659,013 for FIG. 1, FIG. 2 and FIG. 3 are retained for FIG. 1, FIG. 2 and FIG. 3 of the present disclosure. FIG. 2 is an atomizer in general accord with the teachings of Bals in U.S. Pat. No. 4,225,084 and others and the description thereof is herein incorporated by reference.

Figure 2A:
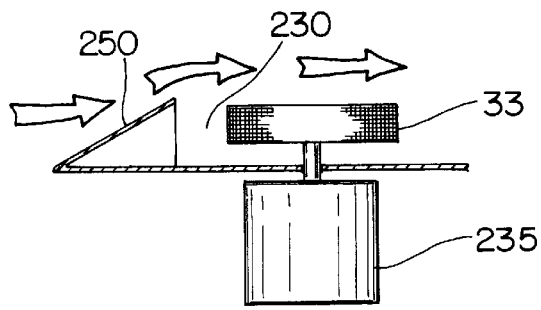
FIG. 2A is a cross-sectional view of a section of a spray unit that is modified in accord with the present invention with an air flow or wind deflector.

FIG. 2A depicts modifications, in accord with the present invention, to a version of the controlled droplet atomizer section 230 of a spray unit generally depicted in FIG. 1. In accord with a preferred method of the present invention open mesh screen 34 enclosing spray head 33 is generally removed when droplets in the range of about 600 to about 800 microns are required as is the case when applying baited sprays to eliminate Mediterranean fruit fly (i.e. medfly) infestations and Caribbean fruit fly (i.e. carribfly) infestations, although screen 34 may be left in place when other droplet sizes are required.

Figure 2B:
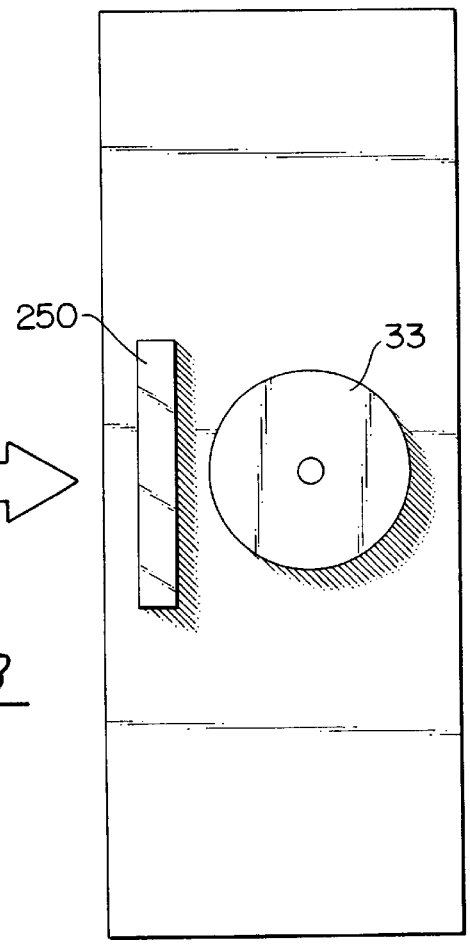
FIG. 2B is a top view of a section of a spray unit that is modified in accord with the present invention with an air flow or wind deflector.

FIG. 2A further depicts, in accord with a preferred mode of the present invention, air deflector 250 situated behind spray head 33, operated without screen 34 driven by hydraulic motor 235 with the airflow direction depicted by arrows. FIG. 2B is a general top view of a version of the controlled droplet atomizer section 230 showing the general relative dispositions of spray head 33, air deflector 250 and direction of air flow. In general, air or wind deflector 250 prevents wind generated by the tangential vortex crossflow fan from blowing droplets behind the atomizer and thereby assists in maintaining a uniform droplet distribution, while the absence of screen 34 permits attainment of larger droplet sizes such as droplets in the 600 to 800 micron size range preferred for baited insecticidal sprays used to control infestations of the Mediterranean or Caribbean fruit flies.

Figure 2C:
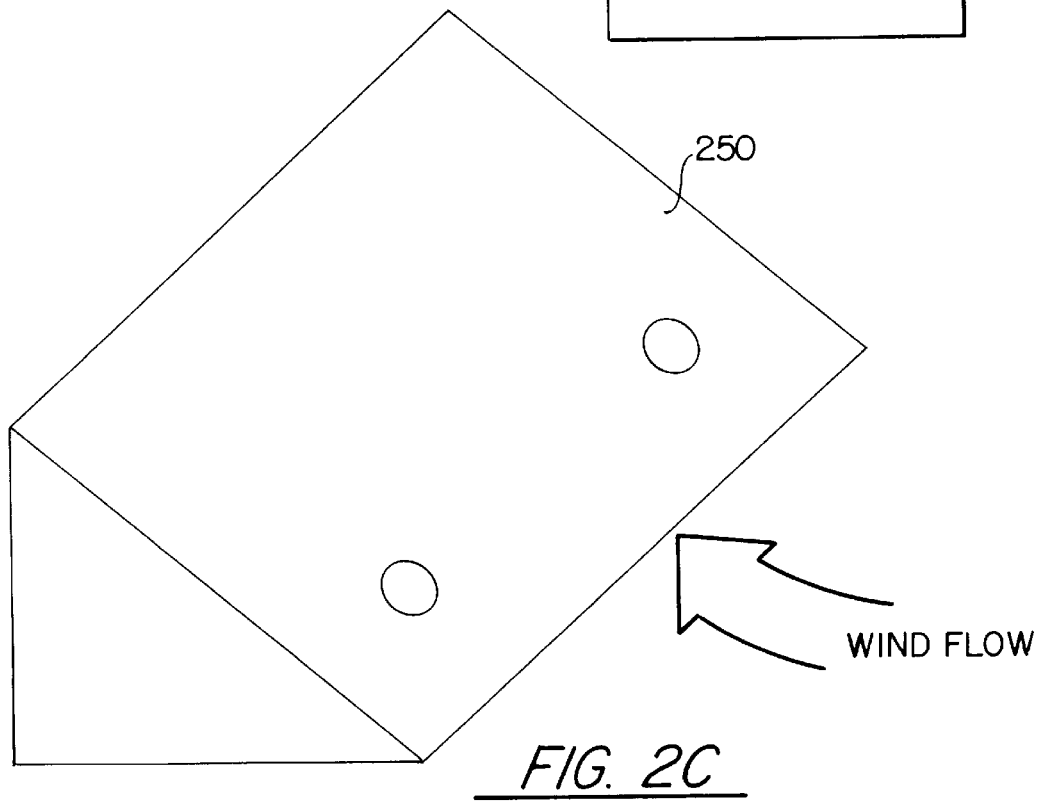
FIG. 2C is a perspective view of an air flow or wind deflector constructed from solid material.

Air deflector 250, also herein designated as wind deflector or wind spoiler is preferably constructed of solid material in the shape of a triangular prism having right triangular ends with 45° acute angles and is mounted behind spray head 33. Air deflector 250 is arranged so that air flow produced by fan 12 (see FIG. 3) striking the plane of air deflector 250, (represented by the hypotenuse of the right triangle when viewed in cross-section) is generally deflected above and around spray head 33 as shown in 2A. Air deflector 250 is generally constructed of any conveniently available material that will not be distorted by the air flow it deflects. Air deflector 250 is preferably constructed from fiberglass reinforced solid polymeric material including for example, acrylics, polyesters, nylons, epoxies and others that are generally commercially available in the art, is sturdy and relatively light, but it may be comprised of other materials such as metals, woods, ceramics and unreinforced plastics. Although the prismatic shape for wind deflector 250 is preferred, with a right triangular prismatic shape most preferred, because it is easily formed and effective, other geometric shapes that provide curved or planar surfaces for the deflection of air flow may also be used. Although air deflector 250 is preferably formed from solid material to provide sturdiness, it will be recognized by those skilled in the art that hollow or hollowed out structures configured either of the prismatic shape or other shapes can be utilized to perform the same function. Air deflector 250 is preferably of a size relative to spray head 33, that is sufficient to shield spray head 33 from the direct impingement of air flow generated by fan 12 without unduly blocking the air flow emanating from fan 12. In practice the dimensions of air deflector 250 may vary considerably according to the shape used. The air deflector should shield an area at least about equal to the diameter of the spray head multiplied by the length of the spray head. Generally for spray heads in common use where the triangular prismatic version depicted in FIG. 2C is applied, the short sides of the triangular faces have lengths of about 0.75 inches to about 3 inches, with lengths of about 1 inch to about 1.5 inches preferred and with about 4 inches to about 8 inches separating the faces with about 5 inches to about 7 inches preferred and about 6 inches most preferred. Holes may be drilled in the spoiler 250 so that it may be mounted in place with bolts, or any other convenient means may be used to mount it in the throat (or delivery throat) 14 (FIG. 1) of fan 12 behind spray head 33. Air spoiler (or wind deflector) 250 is mounted between the wind source and spray head 33 so that the face of the air spoiler proximal to the surface of spray head 33 is about 2 inches to about 3 inches from the rotational axis of spray head 33. However, this may vary to some extent depending on the specific spray unit used and the shape of the air deflector.

FIG. 3, as a point of reference, depicts an unmodified controlled droplet unit, by means of a full cross section elevation view taken through the fan and spray unit of FIG. 1 intermediate the controlled droplet atomizers corresponding to FIG. 3 of U.S. Pat. No. 4,659,013.

Figure 4:
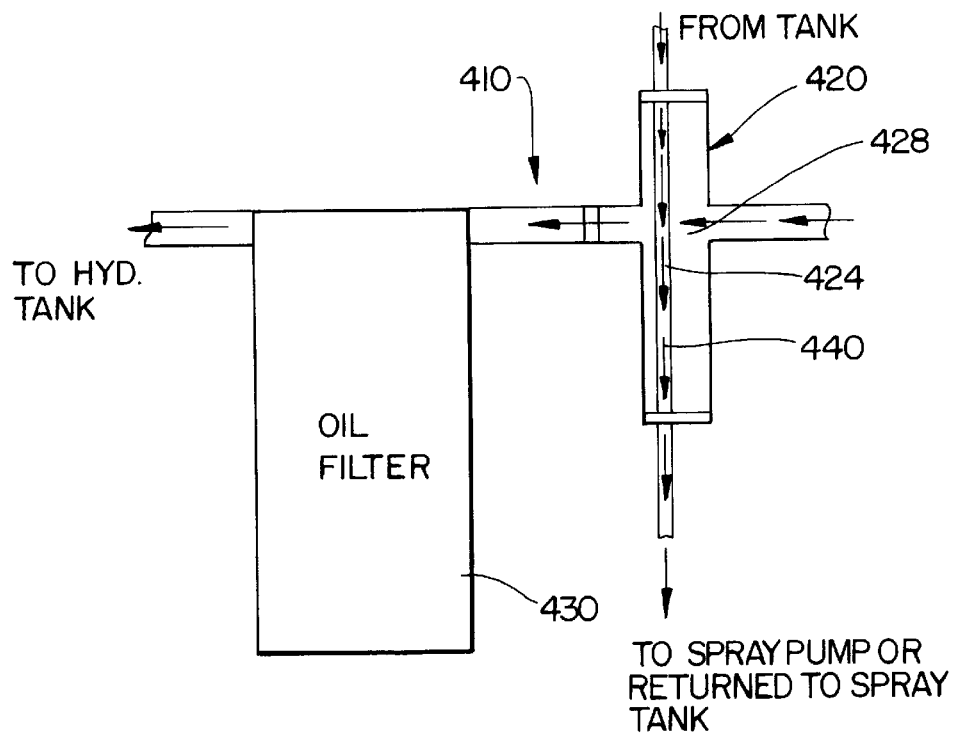
FIG. 4 is a cross-sectional view of a section of a spray unit depicting a version of a modification to maintain the spray mixture at an elevated temperature.
Figure 5:
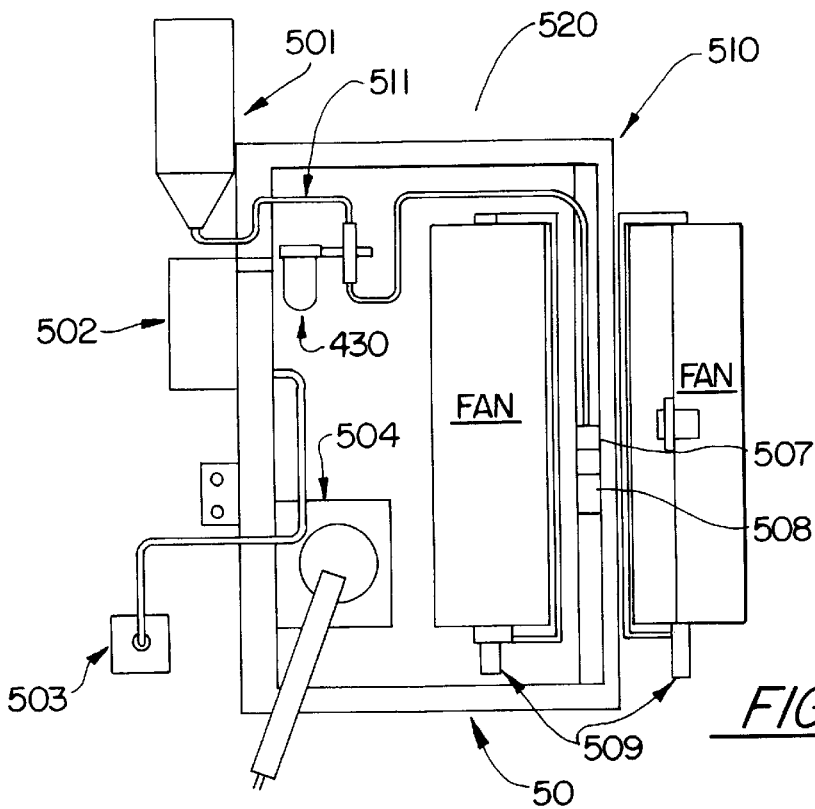
FIG. 5 is a schematic sketch depicting a view in elevation of a version of a spray unit for controlled droplet atomizers having right and left side vortex fans in vertical disposition that is modified in accord with the present invention.

FIG. 4 is a cross-sectional view of a section 410 of the hydraulic system of a spray unit depicting a section 420 of the hydraulic manifold located before oil filter 430 that is modified by the formation of a flange to allow a section 440 of the tubing used to conduct the spray mixture 424 from a material supply tank (depicted in FIG. 5) to a spray pump (depicted in FIG. 5). Modified section or flange 420 of the manifold is filled with circulating hydraulic fluid 428 that becomes heated as the spraying operation proceeds and in effect, serves as a heated oil bath to maintain spray mixture 424 at an appropriate viscosity or liquidity so that it may be pumped through spray head 33. Flange 420 is sealed around tubing section 440 by means known in the art to create seals to retain hot hydraulic fluid or oil, such as o-rings, gaskets and the like, or any other convenient means known in the art. The tubing used to conduct the spray mixture through the hydraulic flow may be of any material generally used in the art for transferring fluids from a supply tank to a spray head, but materials having sufficient heat conduction to allow efficient heat transfer from the hydraulic fluid to spray mixture 424 are preferred.

FIG. 5 is a sketch schematically depicting a view in elevation of a version of a spray unit for controlled droplet atomizers 50 having right and left side vortex fans in vertical disposition that is modified in accord with the present invention, showing a preferred location of modified section 420 in the general vicinity of the entrance to oil filter 430. Depicted in the sketch are storage tank for spray material 501, hydraulic supply tank 502, hydraulic pump 503, hydraulic oil cooler 504, oil filter 430, spray material heater 420, peristaltic spray pumps 507, hydraulic motor for spray pumps 508, hydraulic motor for fans 509, hydraulic manifold 510, and material feed line 511 conveying spray material to spray pumps 507. Spray mixture 424 may also be heated by hydraulic fluid 428 at any other suitable location in the hydraulic system at which hydraulic fluid 428 has a temperature that is adequate to maintain spray mixture 424 at an appropriate liquidity for spraying. As is known in the art, insulation may be applied to spray material feed lines 511 and to the hydraulic manifold 510 to prevent heat loss and assist in maintaining spray mixture 424 at a suitable liquidity or viscosity for spraying.

Although the method of heating spray mixture 424 by means of hydraulic fluid 428 is preferred because it is convenient, efficient and economical, spray mixture 424 may be heated by other means commonly known in the art such as heating tapes, hot air heaters and radiant heaters and the like and at any point that enables sufficient heat transfer to spray mixture 424 to maintain it at an appropriate liquidity or viscosity for spraying, including while it is resident in spray material tank 501 and in its transit through spray material feed line 511, spray pump 507 and spray head 33.

In order to maintain the appropriate consistency or degree of fluidity for spraying bait and malathion and other insecticide mixtures useful in the control of the medfly and caribfly, spray mixture 424 should be maintained above about 60° F. and should preferably be maintained within a temperature range of about 80° F. to about 90° F. with a temperature of about 85° F. most preferred. A typical formulation used in the control of the medfly or caribfly comprises about 2.4 oz of liquid insecticide comprising about 95° malathion and about 9.6 oz of protein liquid bait. An example of a useful bait is "NU-LURE Insect Bait" produced by Miller Chemical & Fertilizer Corporation, Hanover, Pa., but other baits and insecticides may also be used. By means of the modified controlled droplet atomizer spray apparatus of the present invention agriculturally active substances may be consistently projected onto crops at relatively low output or dose rates. Liquid insecticide bait formulations such as those useful in control of the medfly and the caribfly may be delivered at an output of about 10 ounces/acre to about 14 ounces per acre with about 11 ounces per acre to about 13 ounces per acre preferred and about 12 ounces per acre most preferred in order to keep the environmental burden low. For such baited insecticidal formulations droplet sizes of about 400 microns to about 1000 microns are effective in some degree, while droplet sizes in the range of about 500 microns to about 900 microns are more effective and therefore more preferred, while droplet sizes in the range of about 600 microns to about 800 microns are most effective and therefore most preferred.

Spray pumps 507 schematically depicted in FIG. 5 are typically peristaltic pumps, which are preferred for consistency of output and convenience. However any other type of pump that is known in the art and capable of metering relatively low quantities of spray material to spray atomizer 33 may be used.

Typically, the controlled droplet atomizer spray unit is mounted on mobile means preferably a tractor or other mechanized vehicle or is mounted on a trailer or movable carriage that is pulled or pushed by a tractor or other mechanized vehicle. In practice, in order to achieve a compact arrangement useful in traversing narrow beds often found in citrus orchards and other commercial agricultural settings the modified spray unit may attached to a tractor by means of a 3 point hitch thereby eliminating the need for a trailer.

In order to achieve optimum performance in terms of droplet size and distribution the operating parameters of the modified controlled droplet atomizer spray system need to be carefully controlled to achieve the optimal droplet size and dosage rates by means of ground borne equipment that is today only achieved with much greater danger of ancillary contamination with airborne equipment. The method of applying a liquid agriculturally active substance to a crop in a controlled manner ground borne in order to obtain an effective droplet size range at low volume output per unit area generally comprises the steps of:

a) providing a spray unit for controlled droplet atomizers mounted on mobile means, with the spray unit comprising at least one powered, high volume, low-to-medium velocity crossflow vortex fan, with each fan having a delivery throat and at least one controlled droplet atomizer located in the delivery throat, and with each controlled droplet atomizer having a spray head and with each spray head enclosed by an open mesh screen, and with each spray head connected to a material supply line and with the material supply line also connected to a reservoir that contains the liquid agriculturally active substance and with the liquid agriculturally active substance being pumped from the reservoir through a material supply line by pumping means to at least one spray head so that when the spray unit is activated an airflow that is a high volume of low-to-medium velocity air moves in a parallel columnar manner through the delivery throat and the at least one atomizer generates a core of droplets from the spray head in a plane substantially parallel to the airflow in the delivery throat with the air enveloping the core and projecting the core of droplets from the fan;

b) mounting a wind deflector comprising a solid object in the delivery throat of the fan upstream from and in proximity to each spray head, so that the wind deflector shields the spray head from direct impingement of airflow generated by the fan while allowing the airflow to flow around the spray head and exit from the delivery throat of the fan and c) heating the liquid agriculturally active substance to obtain an appropriate fluidity for the effective droplet size;

d) transporting the spray unit on the ground at a speed S and, pumping a total volume per unit time V of the liquid agriculturally active substance through each spray head, and rotating each spray head at a rotational velocity R that is effective in producing a spray having the effective droplet size range, and projecting the spray through a spray band having a width W with the spray unit having an output of spray per unit area OP that is defined by the equation:

$$OP=KV/WS,$$

wherein K is a constant conversion factor.

The following example, which is presented solely for illustration and is not intended to suggest any limitation of the method and means of the present invention to a particular formulation, depicts operating parameters used to achieve a droplet size distribution of about 600 to about 800 microns at a dosage rate of about 12 oz per acre using a typical formulation for the control of the medfly or caribfly, comprising about 2.4 oz of liquid insecticide comprising about 97° Malathion (Fyfanon®-ULV, [EPA Reg. No. 4787-8], manufactured by Cheminova, Lemvig, Denmark and Wayne, N.J.) and about 9.6 oz of NU-LURE insect bait liquid, a proteinaceous liquid derived from corn, using the modified controlled droplet atomizer spray system of the present invention.

A commercially available sprayer having two fans and with a spray head for each fan was modified as schematically depicted in FIGS. 2A, 2B, 2C, 4 and 5. Spray atomizer heads 33 were operated without open mesh screen 34. An air deflector 250 was mounted about 2 to about 3 inches behind each spray atomizer head 33 as generally depicted in FIG. 2A. The air deflector was fabricated from a block of fiberglass reinforced polymer in the form of a right triangular prism having about 6 inches separating the triangular faces and with the short sides of the triangular faces having a length of about 1 inch to about 1.5 inches. The hydraulic system was modified as depicted in FIGS. 4 and 5 in order to heat spray mixture 424. Spray mixture 424 was heated to a temperature of about 85° F. by this means. Spray mixture 424 was pumped to spray head 33 by means of a MASTERFLEX model 7016-20 peristaltic pump.

The following table depicts the operating conditions to obtain an output of about 12 oz per acre with a droplet size of 600–800 micron.

| Peristaltic Pump Drive RPM | Tractor Speed MPH | Hydraulic Pressure of Entire Unit PSI | Fan Speed RPM | Atomizer Turns RPM |
|---|---|---|---|---|
| 65 | 5 | 2100 | 2500–3500 | 2500 |

Output per acre was determined by catching the spray from each spray head in a container for one minute, measuring its volume in a graduated cylinder and then converting to output per acre by using the formula:

output/acre=495(spray rate(oz)/min)/width of spray band(ft)× speed(mph)

commonly known in the art, in which 495 is a constant conversion factor.

Output was generally in the range of about 85 ml to about 95 ml per minute or on average about 90 ml per minute per spray head on a unit having 2 spray heads with each spray head covering one side of the spray band. Droplet size was determined by a standard test generally used in the art, namely, random placement in the area to be sprayed of 5"×8" spray cards and then examination of the droplets caught on the cards under magnification and determination of the droplet size range within a unit area. It was found that the above conditions yielded a total emission or output for two spray heads of 12 oz per acre, which is defined by agricultural authorities as an ultra low volume rate per acre, and that droplet size was in the range of 600 micron to 800 micron. An area of about 20 acres of white grapefruit known to contain a population of about 351 medflies, as determined by a standard bait trap method generally known and practiced in the art, was sprayed. Two flies were caught the first day after spraying, 1 fly was caught on the second and 1 fly was caught on third day after spraying. The medfly population was found to be zero on the sixth day after spraying. These results demonstrated the effectiveness of ground borne treatment using the method and means of the present invention in controlling a high population of an extremely destructive agricultural pest.

Spray output per acre is determined by the ratio of the volume output per minute of the pump and the speed at which the tractor moves. For a given pump, the spray output per acre may be set by maintaining in fixed ratio the relative speeds of the pump drive and the tractor velocity. To obtain an output of about 12 oz per acre with a 2 spray head unit, in a 50 foot spray band a pump output of about 80 ml to about 100 ml of spray material per minute per spray head at a spray unit velocity of 5 mile per hour is preferred, with a pump output of about 85 ml to about 95 ml per minute per spray head more preferred and a pump output of about 90 ml per minute per spray head most preferred.

As is known in the art, a major factor in controlling droplet size is the rotational speed of the atomizer. However, extraneous wind currents generated by the fans used to disperse the droplets can produce a wider distribution of droplets and make it difficult to produce larger sized droplets as are preferred for control of certain pests. The use of the air deflector of the present invention eliminates these problems making it possible to more precisely control droplet size via atomizer turns. Droplet size is also determined by the viscosity or fluidity of the liquid being dispersed. At a given spray material viscosity droplet size can be precisely controlled by spray head rpm. The present invention by providing controlled heating of the spray material so that it can be maintained at a suitable fluidity further enables precise control of droplet size by adjustment of spray head rpm.

The present invention provides an economical method and means of applying liquid active agents, such as baited insecticides, ground borne at ultra low volume rate per acre in optimal droplet sizes heretofore obtained only by aerial spraying. The method and means of the present invention enhance environmental safety by providing specificity of application at ultra low dose rates as well as optimized efficiency by delivering the active agent in the most effective droplet size.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of applying a liquid agriculturally active substance to a crop in a controlled manner ground borne in order to obtain an effective droplet size range at low volume output per unit area comprising the steps of:
    a) providing a spray unit for controlled droplet atomizers mounted on mobile means, with the spray unit comprising at least one powered, high volume, low-to-medium velocity crossflow vortex fan operating at substantially between 2500–3500 rpm, with each fan having a delivery throat and at least one controlled droplet atomizer which turns at substantially 2500 rpm and is located in the delivery throat, and with each controlled droplet atomizer having a spray head and with each spray head being opened to ambient, and with each spray head connected to a material supply line and with the material supply line also connected to a reservoir that contains the liquid agriculturally active substance and with the liquid agriculturally active substance being pumped from the reservoir through a material supply line by pumping means to at least one spray head so that when the spray unit is activated an airflow that is a high volume of low-to-medium velocity air moves in a parallel columnar manner through the delivery throat and the at least one atomizer generates a core of droplets from the spray head in a plane substantially parallel to the airflow in the delivery throat with the air enveloping the core and projecting the core of droplets from the fan;
    b) mounting a wind deflector comprising a solid object in the delivery throat of the fan upstream from and in proximity to each spray head, so that the wind deflector shields the spray head from direct impingement of airflow generated by the fan while allowing the airflow to flow around the spray head and exit from the delivery throat of the fan and c) heating the liquid agriculturally active substance to obtain an appropriate fluidity for the effective droplet size;

d) transporting the spray unit on the ground at a speed substantially equal to 5 mph and, pumping a total volume per unit time V of the liquid agriculturally active substance through each spray head, and rotating each spray head at a rotational velocity R that is effective in producing a spray having the effective droplet size range consisting of between 600 microns to about 800 microns, and projecting the spray through a spray band having a width W with the spray unit having an output of spray per unit area OP that is defined by the equation:

$$OP=KV/WS,$$

wherein K is a constant conversion factor.

2. The method of claim 1 in which the wind deflector comprises a triangular prism having two triangular ends, with each triangular end having a first angle and a second angle and a third angle, with a side of length A opposite the first angle and a side of length B opposite the second angle and a side of length C opposite the third angle, with the triangular ends separated by a length L, so that the triangular ends of the prism are connected by three substantially rectangular planes and with the wind deflector mounted so that a substantially rectangular plane forms a base with the base attached to the throat of the fan and with the length L of the base having an orientation that is about perpendicular to the direction of the airflow.

3. The method of claim 2 in which the first angle and the second angle of the triangular ends are about 45° and the third angle is about 90° and the base has a width of length A or length B and the substantially rectangular plane that is opposite the about 90° angle and has a width of length C is directly exposed to the airflow.

4. The method of claim 3 in which the wind deflector is comprised of fiberglass reinforced solid polymeric material, and length L is about 5 inches to about 7 inches and length A and length B are about 1 inch to about 1.5 inches.

5. The method of claim 1 in which OP ranges from about 10 ounces per acre to about 14 ounces per acre.

6. The method of claim 1 in which OP ranges from about 11 ounces per acre to about 13 ounces per acre.

7. A method of applying a liquid agriculturally active substance to a crop in a controlled manner ground borne in order to obtain an effective droplet size range at low volume output per unit area comprising the steps of:

a) providing a powered hydraulically driven spray unit for controlled droplet atomizers mounted on mobile means, with the spray unit comprising at least one high volume, low-to-medium velocity crossflow vortex fan, with the at least one fan driven by a hydraulic motor, and with each fan having a delivery throat, and at least one controlled droplet atomizer located in the delivery throat, and with the at least one controlled droplet atomizer driven by a hydraulic motor and with each controlled droplet atomizer having a spray head and with each spray head enclosed by an open mesh screen, and with each spray head connected to a material supply line and with the material supply line also connected to a reservoir that contains the agriculturally active substance and with the material supply line passing through a peristaltic pump that pumps the agriculturally active substance to at least one spray head and with the hydraulic motors connected to a hydraulic system comprising a hydraulic manifold through which hydraulic fluid is pumped by a powered hydraulic pump, so that when the spray unit is activated an airflow that is a high volume of low-to-medium velocity air moves in a parallel columnar manner through the delivery throat of each fan and each atomizer generates a core of droplets of the liquid agriculturally active substance from the spray head in a plane substantially parallel to the airflow in the delivery throat with the air enveloping the core and projecting the core of droplets from the fan;

b) mounting a wind deflector in the delivery throat of the fan upstream from and in proximity to each spray head, the wind deflector comprising a triangular prism having two triangular ends, with each triangular end having a first angle and a second angle and a third angle, with a side of length A opposite the first angle and a side of length B opposite the second angle and a side of length C opposite the third angle, with the triangular ends separated by a length L, so that the triangular ends of the prism are connected by three substantially rectangular planes and with the wind deflector mounted so that a substantially rectangular plane forms a base with the base attached to the throat of the fan and with the length L of the base having an orientation that is about perpendicular to the direction of the airflow with the wind deflector shielding the spray head from direct impingement of airflow generated by the fan while allowing the airflow to flow around the spray head and exit from the delivery throat of the fan, and c) providing a flange on the hydraulic manifold and passing a section of the material supply line through the flange and sealing the flange around the section of the material supply line so that as hydraulic oil is pumped through the hydraulic manifold it fills the flange and bathes the section of the material supply line thereby heating the liquid agriculturally active substance as it passes through the section of the material supply line to a temperature at which the liquid agriculturally active substance has an appropriate fluidity for the effective droplet size;

d) transporting the spray unit on the ground at a speed substantially equal to 5 mph and, pumping a total volume per unit time at substantially between 80 ml to 100 ml of the liquid agriculturally active substance through each spray head, and rotating each spray head at a rotational velocity that is effective in producing a spray having the effective droplet size range of substantially equal to 400 microns to 1000 microns, and projecting the spray through a spray band having a width substantially equal to 50 feet with the spray unit having an output of spray per unit area OP that is defined by the equation:

$$OP=KV/WS,$$

wherein K is a constant conversion factor, and the OP is substantially equal to between 10 ounces per acre to 14 ounces per acre.

8. The method of claim 7 in which the first angle and the second angle of the triangular ends of the wind deflector comprising the triangular prism are about 45° and the third angle is about 90° and the base has a width of length A or length B and the substantially rectangular plane that is opposite the about 90° angle and has a width of length C is directly exposed to the airflow.

9. The method of claim 8 in which the wind deflector is comprised of fiberglass reinforced solid polymeric material, and length L is about 5 inches to about 7 inches and length A and length B are about 1 inch to about 1.5 inches.

10. The method of claim 9 in which the liquid active agricultural substance comprises an insecticide and bait formulation useful in the control of Caribbean fruit flies and Mediterranean fruit flies and OP is about 12 ounces per acre and the effective droplet size range is about 600 microns to about 800 microns and the formulation is heated to a temperature of about 80° F. to about 90° F.

11. The method of claim 10 in which the insecticide comprises a formulation comprising malathion and the bait comprises a proteinaceous liquid derived from corn with the proteinaceous liquid being an attractant to Caribbean fruit flies and Mediterranean fruit flies.

12. The method of claim 7 in which OP ranges from about 11 ounces per acre to about 13 ounces per acre.

* * * * *